April 10, 1973   J. GELLON ET AL   3,726,738
METHOD OF MAKING A CARBONIZED MATERIAL OF EXPANDED
GRAPHITE AND CARBON FIBERS
Filed Aug. 21, 1970

United States Patent Office 3,726,738
Patented Apr. 10, 1973

3,726,738
METHOD OF MAKING A CARBONIZED MATERIAL OF EXPANDED GRAPHITE AND CARBON FIBERS
Joseph Gellon, 20 Rue de Villeneuve, 92 Clichy, France, and Jean-Pierre Slonina, 23 bis Route de la Cascade, 78 Le Vesinet, France
Filed Aug. 21, 1970, Ser. No. 66,030
Claims priority, application France, Aug. 7, 1969, 6929331
Int. Cl. B32b 31/04
U.S. Cl. 156—276
9 Claims

ABSTRACT OF THE DISCLOSURE

A method of manufacturing a carbonised material which is resilient and resistant to high temperatures consists in closely combining together expanded graphite and carbon fibres.

Figure 1:
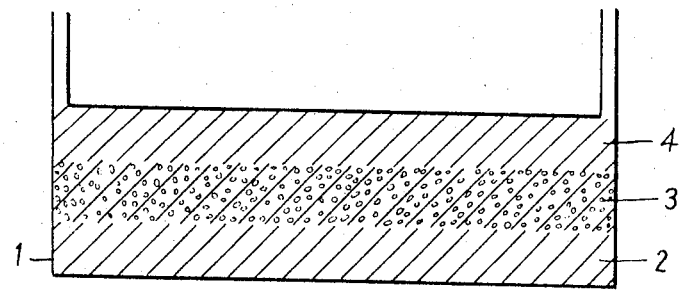

The present invention relates to a method of manufacturing a carbonised material that is resilient and/or resistant to high temperatures e.g. in the region 300–2000° C., more particularly for use in making a sealing joint which may be used at high temperatures. The invention also relates to joints so made, such joints having great resilient properties at high temperatures along lines of compression. The invention allows this result to be obtained by the association of two constituent materials: expanded graphite on the one hand and carbon fibre on the other hand.

Expanded graphite was originally described in 1865 in the prior art by Gottschalk and subsequently by Moissan. It is obtained industrially most frequently by intensely heating lamellar complexes or residual complexes, more particularly acidic sulphate of graphite or a complex reduced by washing in water. The initial particles are formed either from "Kish" graphite, i.e. graphite which separates from molten high carbon cast iron, or from pyrolytic carbon again treated at high temperatures, or natural graphite in small plates.

The expanded graphite is, for example, in the form of very light vermicular particles, expansion along the crystallographic axis c being higher than 100. The apparent density of a powder of such expanded graphite is between 10 and 50 g./dm.$^3$.

Expanded graphite can be made, for example, by the apparatus described in our prior French patent specification No. 1,585,066.

The planes of the graphite are not all seperated but are grouped in lenticular form in 10's or 20's. It has been shown that the separation of the planes of the lamellar or residual composition is due to the forcible parting of the inserted compound, at the time of the thermal treatment.

Given the large surface of the plate, approximately 600 to 800 microns at its greatest and the slight thickness between bundles of planes of carbon separated by a larger space than the interrecticular distance of graphite, approximately 50 to 100 A., the bundles of planes have excellent coating properties which allow any material to be incorporated in the forms of suitably chose fibres or powders.

Carbon fibre is now well known. In our British patent specification No. 1,016,351, we have described a method of manufacturing carbon fibres, wadding, wools and fabrics.

It is an object of the present invention to associate these two materials, i.e. expanded graphite and carbon fibre, with appropriate properties in order to obtain a material which can resist high temperatures and have great elasticity, a material particularly well adapted to withstand high temperatures whilst preserving suitable resilient properties.

The invention consists in a method of manufacturing a carbonised material that is resilient and/or resistant to high temperatures, said method consisting in associating expanded graphite and carbon fibres, the carbon fibres being interengaged with the expanded graphite.

Advantageously, the expanded graphite is homogeneously mixed with carbon fibres having an elementary diameter between 5 and 15 microns.

The invention also consists in a carbonised material whenever made by the method of the invention.

In a first embodiment, carbon fibres are firstly carded in the form of wadding, of apparent diameter 5 to 10 mm., and the expanded graphite and carbon wadding assembly is then suspended in a cold fluidised bed. The carbon wadding is gradually surrounded by the vermicular particles of expanded graphite. After stopping the fluid bed, the assembly is compressed at a pressure between 20 bars and 50 hectobars, according to the properties required, or it may be laminated.

In another embodiment of the invention, carbon fabric or carbon braid regularly wound is interposed between two plates of expanded graphite which have previously been slightly compressed, e.g. at a pressure of 0.1–0.2 bar/cm.$^2$. At the time of compression or final lamination, the fabric or braid is interengaged in the expanded graphite to form a massive assembly whose method of manufacture is described hereinafter in Example III.

There are two major and important properties of the material thus obtained, viz:

(1) A sealing capacity against liquids and gas (neutral or reducing) at temperatures higher than 600° C.;

(2) An elasticity of a joint made therefrom when a unidirectional pressure is applied thereto. This elasticity is of the order of 15 to 20%, the material retaining its initial value when the stress ceases to be exerted.

The material thus obtained may be made in all sizes. However, it may be suitable to make it in the form of thin sheets, i.e. of one or two mm. thickness, which are cut up so as to form joints of any desired size, or alternatively to form joints of standard dimensions.

In order that the invention may be more clearly understood, reference will now be made to the following non-limiting specific examples and to the accompanying drawings illustrating them.

EXAMPLE I

In a vertical tube 200 mm. in diameter and 1 m. in height, 50 grams of expanded graphite is introduced which represents 3 dm.$^3$ in volume, together with an identical quantity in volume of carbon wadding made of short and fine fibres in bulk form, of dull black colour, and whose carbon content is between 90 and 95% and whose residual ash is 0.6%. A gaseous current fed in at the base of the tubes allows the whole to be mixed in a homogeneous manner. After mixing for 10 minutes, the mixture which is very voluminous, is introduced into a mould made of a plastics material of an inner diameter of 90 mm. The pressure applied is 10 bars.

FIG. 1 of the accompanying drawings explains the method. A thin coating of loose expanded graphite powder 2 of about 2.5–3.5 mm. in thickness, is arranged on the base of a mould 1, then a preform 3 comprising a mixture of wadding and expanded graphite is introduced and finally the whole is covered with expanded graphite at 4 to a thickness of the order of 3 mm. The whole assembly is then compressed, as has been described above, at 10 bars and placed in a metal matrix of a slightly greater diameter than that of the mould made of a plastics material. Then a pressure of one hectobar is applied which results in a disc 92 mm. in diameter and 2 mm. in depth. The material thus produced has been tested: cycles of successive charges and discharges at a pressure of 7.5 bars allow an elasticity of 1/10 mm. to be exhibited without hysteresis and without loss of elasticity over a series of 20 cycles at ambient temperature.

EXAMPLE II

A sheet 2 mm. in thickness is prepared by laminating between two supple cardboard sheets a mixture which has been prepared in a fluidised bed such as described in Example I, and comprising, in volume, 70% of carbon wadding, whose carbon content is between 90 and 95% and which is formed from fine and short elementary fibres whose diameter is of the order of 5 to 12 microns, and 30% of expanded graphite.

The products obtained according to this example may form a joint 30 mm. in diameter. Inserted into an assembly in place of an ordinary rubber toric joint, the joint produced according to the invention can retain a primary vacuum, i.e. 1/10 mm. of mercury.

The resilience of the joint which is obtained according to this example may be measured by means as described below:

The joint is arranged between two graphite cylinders externally heated by heating collars and arranged between two water-cooled plates.

The whole is retained between the two plates of a press. Pressure applied is 10 bars at a temperature of 600° C. The rebound measure is 17% without hysteresis after 10 successive cycles of charges and discharges.

EXAMPLE III

On a sheet of porous cardboard is placed a sheet of expanded graphite 1 mm. thick, slightly compressed to a density of 0.1 to 0.2, then a layer of carbon fabric whose characteristics are as follows:

| | | |
|---|---|---|
| Diameter of threads | mm | 0.6–0.7 |
| Thickness | mm | 0.4–0.5 |
| Weight per m.$^2$ | g | 200–250 |
| Electrical resistance of a square measured along one side | ohm | 1.25 |
| Carbon content | percent | 99–100 |
| Residual ash | do | 0.1–0.2 |
| Volatile content | do | <1 |

This is covered with another sheet of expanded graphite similar to the first, and then a further sheet of porous cardboard. The whole is then compressed at a pressure of one hectobar. The porous cardboard is removed after the compression operation.

The sandwich of expanded graphite/carbon/cloth/expanded graphite obtained, remains supple and has properties of elasticity when hot of 20% at 600° C.

As many sheets of expanded graphite and layers of carbon cloth may be superposed as is necessary to obtain, under the circumstances, the desired thickness, the whole also being compressed between two sheets of porous cardboard.

Figure 2:
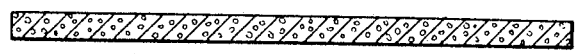

FIG. 2 represents the sheet of material produced according to the present invention, showing the interengagement of the carbon wadding or carbon fabric and expanded graphite. This sheet is then cut up in any desired fashion to produce a resilient joint resistant to high temperature according to the invention.

We claim:

1. A method of manufacturing a carbonised material which is resilient and resistant to high temperatures, wherein carbon fibres are combined with expanded graphite, the carbon fibres being interengaged with the expanded graphite.

2. A method according to claim 1, wherein the expanded graphite is mixed by cold fluidisation with carbon fibres which have been previously carded in the form of wadding, the mixture obtained being compressed at a pressure between 20 bars and 50 hectobars.

3. A method according to claim 1, wherein compression is exerted on the mixture through two thicknesses of expanded graphite.

4. A method according to claim 3, wherein the mixture obtained is compressed between two sheets of porous cardboard.

5. A method according to claim 1, wherein the expanded graphite is used in the form of plates which have previously been slightly compressed.

6. A method according to claim 1, wherein the carbon fibres are in the form of carbon fabric.

7. A method according to claim 1, wherein the carbon fibres are in the form of uniformly wound braid.

8. A method according to claim 1, wherein carbon fibres are compressed between two plates of expanded graphite that have previously been slightly compressed, the said plates of expanded graphite being covered with sheets of porous cardboard on the outer face, the pressure exerted being 1 hectobar and the sheets of porous cardboard being removed after compression.

9. A method according to claim 1, wherein expanded graphite is homogeneously mixed with carbon fibres having an elementary diameter between 5 and 15 microns.

References Cited

UNITED STATES PATENTS

| | | | |
|---|---|---|---|
| 3,413,239 | 11/1968 | Olstowski et al. | 204—294 X |
| 3,476,677 | 11/1969 | Corley et al. | 204—294 X |
| 3,011,981 | 12/1961 | Soltes | 252—502 |
| 3,431,970 | 3/1969 | Olstowski et al. | 106—56 X |

PHILIP DIER, Primary Examiner

U.S. Cl. X.R.

106—56; 156—369; 161—87, 182; 204—209.4, 294; 264—113, 122

UNITED STATES PATENT OFFICE
CERTIFICATE OF CORRECTION

Patent No. 3,726,738          Dated April 10, 1973

Inventor(s) JOSEPH GELLON and JEAN-PIERRE SLONINA

It is certified that error appears in the above-identified patent and that said Letters Patent are hereby corrected as shown below:

Claims priority, application France, August 27, 1969

Signed and sealed this 23rd day of October 1973.

(SEAL)
Attest:

EDWARD M. FLETCHER, JR.　　　　　　　　RENE D. TEGTMEYER
Attesting Officer　　　　　　　　　　　　Acting Commissioner of Patents